US007506101B2

(12) United States Patent
Liu et al.

(10) Patent No.: US 7,506,101 B2
(45) Date of Patent: Mar. 17, 2009

(54) DATA MIGRATION METHOD AND SYSTEM

(75) Inventors: Fuming Liu, Yokohama (JP); Mikihiko Tokunaga, Fujisawa (JP); Shoichi Fukumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 574 days.

(21) Appl. No.: 11/346,309

(22) Filed: Feb. 3, 2006

(65) Prior Publication Data
US 2007/0130423 A1 Jun. 7, 2007

(30) Foreign Application Priority Data
Dec. 5, 2005 (JP) ............................. 2005-350870

(51) Int. Cl.
*G06F 17/30* (2006.01)
*G06F 12/16* (2006.01)
(52) U.S. Cl. .................... 711/114; 711/165; 707/10
(58) Field of Classification Search ................. None
See application file for complete search history.

(56) References Cited
U.S. PATENT DOCUMENTS
6,895,483 B2 * 5/2005 Eguchi et al. ............... 711/165

2004/0225662 A1 * 11/2004 Nojima .......................... 707/10

FOREIGN PATENT DOCUMENTS
JP 2003-015917 7/2001
JP 2005-107645 9/2003

* cited by examiner

*Primary Examiner*—Hyung S Sough
*Assistant Examiner*—Duc T Doan
(74) *Attorney, Agent, or Firm*—Reed Smith LLP; Juan Carlos A. Marquez, Esq.

(57) ABSTRACT

The present invention provides a data migration technique enabling a required performance to be satisfied as closely as possible. A server obtains an IOPS measurement value of a plurality of business APs and an IOPS measurement value of a plurality of logical volumes serving as the access destinations of the respective business APs, and on the basis of the various obtained IOPS measurement values, selects a source sub-candidate from a plurality of VOLs. The server identifies a parity group to which the selected source sub-candidate belongs from a plurality of parity groups, sets the two or more VOLs belonging to the identified parity group as two or more source candidates, and selects a plurality of target candidates from a plurality of other VOLs. The server then selects the source candidate/target candidate pair that is forecast to perform migration most favorably and/or forecast to produce the most favorable migration result, and performs data migration from the source to the target constituting the selected pair.

16 Claims, 9 Drawing Sheets

FIG. 6A

| BUSINESS AP ID | BUSINESS AP NAME | IOPS MEASUREMENT VALUE |
|---|---|---|
| 51A | AAAA | 50000 |
| 51B | BBBB | 40000 |
| 51C | CCCC | 30000 |
| 51D | DDDD | 20000 |
| ... | ... | ... |

| VOL ID | VOL NAME | VOLUME ATTRIBUTES | PARITY GROUP ID | IOPS MEASUREMENT VALUE |
|---|---|---|---|---|
| 63A | PG1-VOL1 | ... | PG1 | 30000 |
| 63B | PG1-VOL2 | ... | PG1 | 30000 |
| 63C | PG1-VOL3 | ... | PG1 | 30000 |
| ... | ... | ... | ... | ... |
| 64A | VVOL1 | ... | PG2 | 0 |
| 64B | VVOL2 | ... | PG2 | 0 |
| 64C | VVOL3 | ... | PG2 | 0 |
| ... | ... | ... | ... | ... |

| VVOL ID | EVOL ID | EVOL ATTRIBUTES | PARITY GROUP ID |
|---|---|---|---|
| 64A | 163A | ... | PG2 |
| 64B | 163B | ... | PG2 |
| 64C | 163C | ... | PG2 |
| ... | ... | ... | ... |

| PARITY GROUP | MAXIMUM IOPS VALUE | USAGE RATE |
|---|---|---|
| PG1 | 120000 | 90% |
| PG2 | 100000 | 0% |
| ... | ... | ... |

| BUSINESS AP ID | VOL ID |
|---|---|
| 51A | 63A |
| 51B | 63B |
| 51C | 63C |
| ... | ... |

| BUSINESS AP ID | VOL ID | DIFFERENCE (PERFORMANCE DIFFERENCE) BETWEEN IOPS MEASUREMENT VALUE OF BUSINESS AP AND IOPS MEASUREMENT VALUE OF VOL |
|---|---|---|
| 51A | 63A | -27500 |
| 51B | 63B | -17500 |
| 51C | 63C | -7500 |
| ... | ... | ... |

FIG. 8A
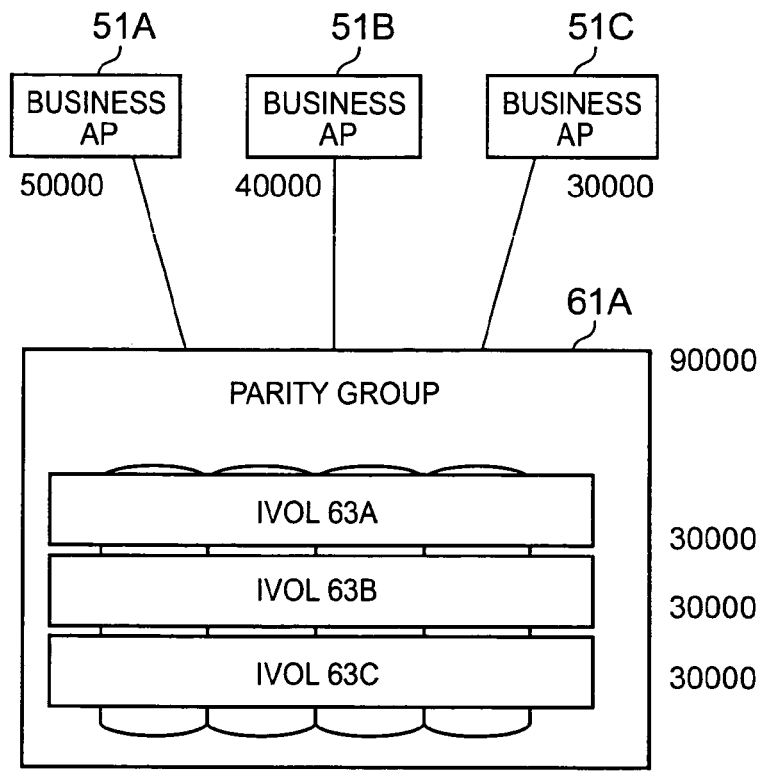
FIG. 8B
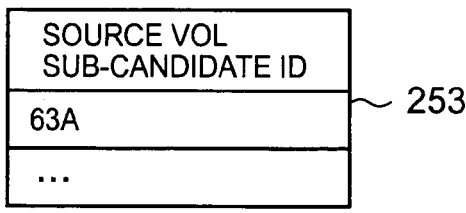
FIG. 8C
| SOURCE VOL SUB-CANDIDATE ID | SOURCE VOL CANDIDATE ID |
|---|---|
| 63A | 63A |
|  | 63B |
|  | 63C |
| ... | ... |
~ 255

| SOURCE VOL SUB-CANDIDATE ID | SOURCE VOL CANDIDATE ID | TARGET VOL CANDIDATE ID |
|---|---|---|
| 63A | 63A | 64A |
|  | 63B | 64C |
|  | 63C | 64B |
| ... | ... | ... |

| SOURCE VOL SUB-CANDIDATE ID | SOURCE VOL ID | TARGET VOL ID |
|---|---|---|
| 63A | 63B | 64C |
| ... | ... | ... |

FIG. 9C

| TARGET VOL SUB-CANDIDATE ID |
|---|
| 64C |
| ... |
| ... |

261

DATA MIGRATION METHOD AND SYSTEM

CROSS-REFERENCE TO PRIOR APPLICATION

This application relates to and claims priority from Japanese Patent Application No. 2005-350870, filed on Dec. 5, 2005 the entire disclosure of which is incorporated herein by reference.

BACKGROUND OF THE INVENTION

The present invention relates to a technique for migrating data.

A data migration technique is known from Japanese Unexamined Patent Application Publication 2003-15917, for example.

SUMMARY OF THE INVENTION

In an example of a known system, one or a plurality of storage systems and one or a plurality of hosts (host apparatuses, for example) are connected to a communication network.

Each storage system may comprise a plurality of physical storage apparatuses, and two or more logical storage apparatuses (logical volumes hereafter) that are set using the storage resources of the plurality of physical storage apparatuses, for example. The logical volumes are capable of storing data.

Each host may comprise a CPU and a storage resource. The storage resource of each host may store one or a plurality of application programs. The CPU may read and execute the application program from the storage resource. The executed application program is capable of writing data to a logical volume of the storage system and reading data from the logical volume.

Recent years have witnessed an increase in the amount of data used by an application program, for example. As time passes, the frequency with which the data are accessed by the application program and the utilization value of the data vary. In terms of data that are used by an application program providing a Web service, for example, the frequency with which the data are accessed may vary greatly according to the usage condition of the Web service.

Moreover, varying utilization values, performance levels, or reliability levels may be required of various data depending on the type of service (i.e. business) provided by the application program in which the data are used. The series of stages from data creation through application, storage, and disposal will be referred to as the life cycle of the data. To ensure that an application program can provide improved service with limited storage resources (in other words, storage capacity), an optimum storage resource (a logical volume, for example) must be selected in accordance with the data utilization value, performance, or reliability required at each stage of the data life cycle, and the data must be stored in the selected storage resource.

In a case where the performance required by the application program varies, for example, when the existence of a logical volume (target volume hereafter) which matches the attributes of another logical volume (source volume hereafter) storing the data used by the application program and which can satisfy the required performance is confirmed, a method of migrating the data in the source volume to the target volume may be considered.

With this method, however, the effect of the performance of the source volume on the performance of other logical volumes is not taken into consideration. Hence, it is believed that optimum migration does not always take place.

Moreover, with this method, when a plurality of migrations is performed, a subsequent migration is performed without taking into consideration the previous migration. Hence, the plurality of migrations may share the same target volume, and as a result, it may be impossible to satisfy the performance required by the application program.

Further, it is believed that convenience would be improved if target volume selection were performed automatically for each migration.

It is therefore an object of the present invention to provide a data migration technique with which a required performance level can be satisfied as closely as possible. Another object of the present invention is to enable automatic selection of a preferred target volume such that the required performance level is satisfied as closely as possible.

Other objects of the present invention will become clear from the following description.

A method according to a first aspect of the present invention is a method of migrating data from a source volume, which is a data migration source logical volume, to a target volume, which is a data migration destination logical volume. Each of one or more storage systems comprising a plurality of logical volumes comprises a plurality of parity groups. Each of the parity groups is constituted by two or more physical storage devices. Two or more logical volumes of the plurality of logical volumes are set on the two or more physical storage devices constituting each of the parity groups.

In this method, an access source performance, which is a performance of an access source of a logical volume, is obtained for each of one or more access sources. A volume performance, which is a performance of a logical volume, is obtained for each logical volume. A source volume sub-candidate is selected from the plurality of logical volumes on the basis of the obtained access source performance of each access source and the obtained volume performance of each logical volume. A parity group to which the selected source volume sub-candidate belongs is identified from the plurality of parity groups. A source volume is selected from two or more source volume candidates constituted by the two or more logical volumes belonging to the identified parity group, and a target volume is selected from the plurality of logical volumes. Data are migrated from the selected source volume to the selected target volume.

In a first aspect of this method, a target volume candidate may be selected, on the basis of the volume performance of each source volume candidate and the volume performance of each logical volume other than the two or more source volume candidates, for each source volume candidate from two or more other logical volumes to make a pair with the source volume candidate. A pair forecast to perform migration most favorably and/or forecast to produce a most favorable migration result may be selected from a plurality of these pairs. In this case, the selected source volume and target volume are the source volume candidate and target volume candidate constituting the selected pair.

In a second aspect of this method, the pair forecast to perform migration most favorably according to the first aspect may be the pair which performs migration in the shortest amount of time.

In a third aspect of this method, the pair forecast to produce the most favorable migration result according to the first aspect may be a pair which, after performing migration, enables the volume performance of the source volume sub-candidate to recover most fully.

In a fourth aspect of this method, a degree of performance degradation may be calculated for each of a plurality of access pairs, which are pairs constituted by each access source and the logical volume serving as the access destination thereof, on the basis of the obtained access source performance of each access source and the obtained volume performance of each logical volume. The logical volume of an access pair having a calculated degree of performance degradation that exceeds a predetermined value may be set as the source volume sub-candidate.

In a fifth aspect of this method, in accordance with the fourth aspect, a plurality of access sources may exist. One or more access sources of a certain parity group, from among the plurality of parity groups, may be identified from the plurality of access sources. The degree of performance degradation may be calculated for each of the access pairs on the basis of a total access source performance, which is a sum total of one or more access source performances corresponding respectively to the one or more identified access sources, a parity performance, which is a sum total of two or more volume performances corresponding respectively to the two or more logical volumes belonging to the certain parity group, the access source performances of the one or more identified access sources, and the volume performances of the two or more logical volumes belonging to the certain parity group.

In a sixth aspect of this method, in accordance with the fifth aspect, the degree of performance degradation for a single access pair may be equal to the volume performance of the logical volume constituting the access pair×an efficacy ratio– the access source performance of the access source constituting the access pair. The efficacy ratio may be equal to the parity performance/the total access source performance.

In a seventh aspect of this invention, in accordance with the fifth aspect, the parity performance of each parity group/a maximum performance of each parity group=a usage rate of each parity group may be calculated. The parity group whose calculated usage rate exceeds a predetermined threshold may be set as the certain parity group.

In an eighth aspect of this method, when a plurality of the source volume sub-candidates exists, selection of a source volume and a target volume may be performed in relation to one of the plurality of source volume sub-candidates assuming that data migration to a target volume from a source volume selected in relation to another source volume sub-candidate is complete, even when this data migration is not complete.

In a ninth aspect of this method, each of the access sources may issue an IO command to an access destination logical volume to read data from the logical volume or write data to the logical volume. The access source performance of a certain access source is a number of IO commands issued from the certain access source per unit time. The volume performance of a certain logical volume is a number of IO commands relating to the certain logical volume that are received in the storage system per unit time.

In a tenth aspect of this method, the access source performance of a certain access source is an amount of data traffic output from the certain access source per unit time. The volume performance of a certain logical volume is an amount of data traffic received in the storage system in relation to the certain logical volume per unit time.

In an eleventh aspect of this method, the one or more storage systems comprise a storage system and an external storage system, which is a storage system existing on the exterior of the storage system. The storage system may comprise a virtual volume, which is a virtual logical volume. The virtual volume is associated with an external volume, which is a logical volume provided on a parity group provided in the external storage system. When the selected target volume is the virtual volume, data may be migrated to the external volume associated with the virtual volume.

In a twelfth aspect of this method, the access source is an application program executed on a host or an operating system of the host.

Each of one or more storage systems comprises a plurality of parity groups. Each of the parity groups is constituted by two or more physical storage devices. Two or more logical volumes of a plurality of logical volumes are set on the two or more physical storage devices constituting each of the parity groups. A data migration system according to a second aspect of the present invention is a system for migrating data from a source volume, which is a data migration source logical volume, to a target volume, which is a data migration destination logical volume. This system comprises: an access source performance obtaining unit for obtaining an access source performance, which is a performance of an access source of a logical volume, for each of one or more access sources; a volume performance obtaining unit for obtaining a volume performance, which is a performance of a logical volume, for each of the plurality of logical volumes provided in the one or more storage systems; a sub-candidate selection unit for selecting a source volume sub-candidate from the plurality of logical volumes on the basis of the obtained access source performance of each access source and the obtained volume performance of each logical volume; a parity identification unit for identifying a parity group to which the selected source volume sub-candidate belongs from the plurality of parity groups; a source/target selection unit for selecting a source volume from two or more source volume candidates constituted by two or more logical volumes belonging to the identified parity group, and selecting a target volume from the plurality of logical volumes; and a migration unit for migrating data from the selected source volume to the selected target volume.

The data migration system may be constructed using one or a plurality of computer machines. At least one of one or more hosts, one or more storage systems, and one or more server machines may be used as the one or plurality of computer machines, for example. The storage system may take the form of a disk array apparatus comprising an array of a plurality of physical storage devices, for example.

The processing that is performed using the data migration method may be executed by various predetermined units. The various units may also be referred to as various means. The units or means may each be realized by hardware (a circuit, for example), a computer program, or a combination thereof (for example, one or a plurality of CPUs which read and execute a computer program). Each computer program may be read from a storage resource (memory, for example) provided in a computer machine. The computer programs may be installed in the storage resource via a recording medium such as a CD-ROM or DVD (Digital Versatile Disk), or downloaded into the storage resource via a communication network such as a LAN or the Internet.

According to the present invention, a data migration technique enabling a required performance to be satisfied as closely as possible can be provided.

BRIEF DESCRIPTION OF THE DRAWINGS

FIG. 6A shows a constitutional example of an AP management table 47, FIG. 6B shows a constitutional example of a VOL management table 147, and FIG. 6C shows a constitutional example of a volume mapping table;

FIGS. 7A to 7C show constitutional examples of a parity management table 248;

FIG. 8A is a view showing an example illustrating a performance difference between a business AP and a VOL, FIG. 8B shows a constitutional example of a source VOL sub-candidate list, and FIG. 8C shows a constitutional example of a source VOL candidate list; and FIG. 9A shows a constitutional example of a migration pair candidate list, FIG. 9B shows a constitutional example of a migration pair list, and FIG. 9C shows a constitutional example of a target VOL sub-candidate list.

DESCRIPTION OF THE PREFERRED EMBODIMENT

Figure 1:
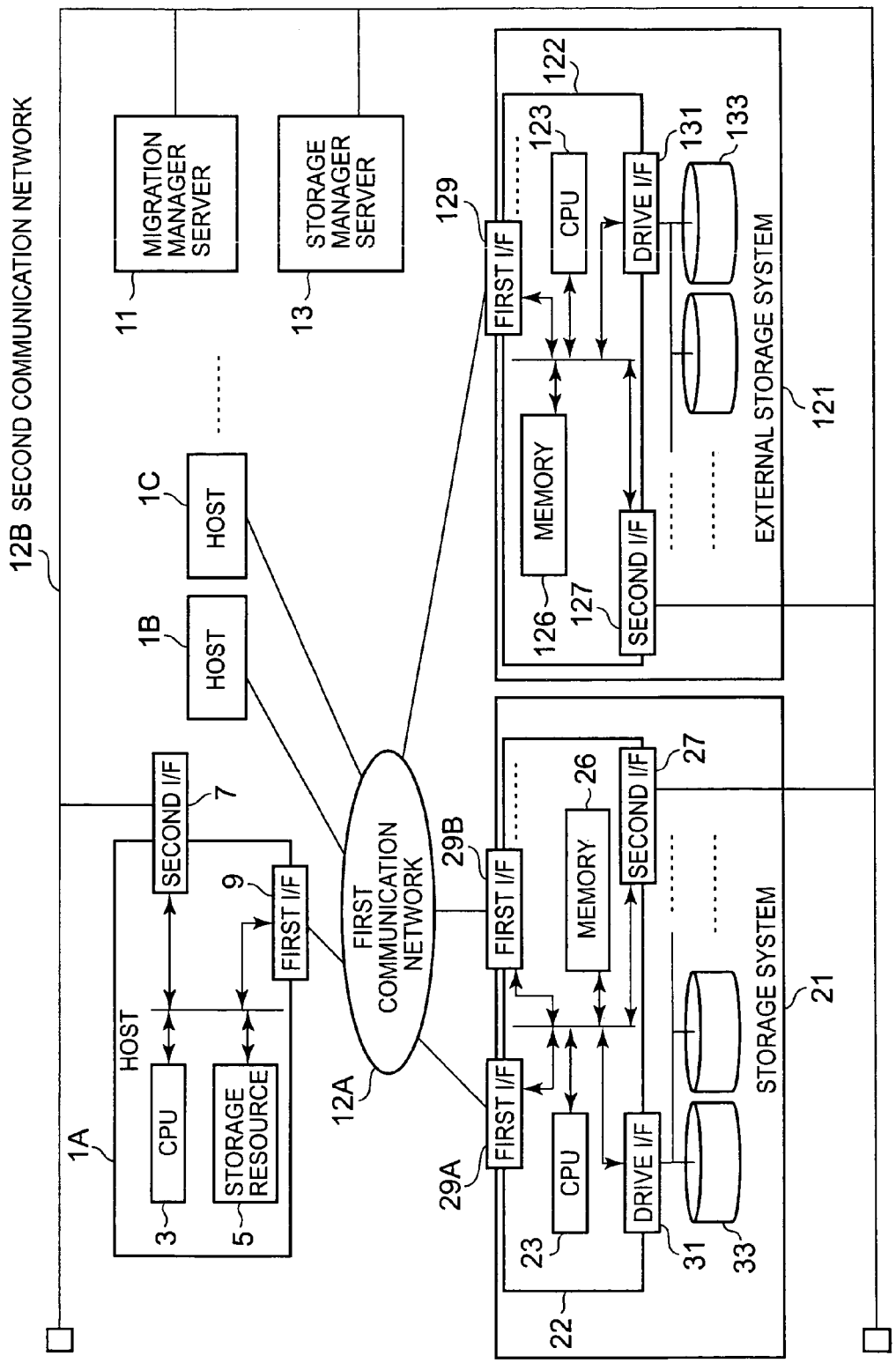
FIG. 1 shows an outline of the physical configuration of a data migration system according to a first embodiment of the present invention.

FIG. 1 shows an outline of the physical configuration of a data migration system according to a first embodiment of the present invention.

A plurality of hosts 1A, 1B, 1C, . . . and a plurality of storage systems 21, 121, . . . are connected to a first communication network 12A. Further, the plurality of hosts 1A, 1B, 1C, . . . , the plurality of storage systems 21, 121, . . . , and a plurality of servers 11, 13, . . . are connected to a second communication network 12B.

The communication networks 12A, 12B maybe provided as a single, undivided communication network. Moreover, the communication networks 12A, 12B may be any type of communication network. In this embodiment, the first communication network 12A may be constituted by a SAN (Storage Area Network), and the second communication network 12B may be constituted by a LAN (Local Area Network).

A single host may be provided. Each host 1A, 1B, 1C, . . . is a type of computer that is capable of issuing an IO command (input/output command) for writing data into a logical volume of the storage system 21 or reading data from the logical volume. Each host 1A, 1B, 1C, . . . is capable of providing a predetermined service (a Web service, for example). Each host 1A, 1B, 1C, . . . may employ a substantially identical hardware configuration. Accordingly, an example of this hardware configuration will be described using the host 1A as an example.

The host 1A may comprise a storage resource (memory or a hard disk drive, for example) 5 which is capable of storing various computer programs, a CPU 3 for reading and executing a computer program from the storage resource 5, one or a plurality of first communication interfaces (I/F hereafter) 9 which serve as communication interfaces for communicating with the first communication network 12A, and a second I/F 7 which serves as a communication interface for communicating with the second communication network 12B. The I/Fs 7, 9 may be constituted by a communication port or a communication controller (a host bus adapter or LAN controller, for example) comprising the communication port, for example.

A single server maybe provided. In this embodiment, two server machines are provided, a migration manager server 11 and a storage manager server 13. The storage manager server 13 is capable of receiving (gathering, for example) a performance level of the logical volumes of each storage system 21, 121 and notifying the migration manager server 11 of the received performance level either periodically or irregularly. The migration manager server 11 is capable of receiving (gathering, for example) a performance level of each application program in each host 1A, 1B, 1C, . . . , determining a logical volume to act as a source volume and a logical volume to act as a target volume on the basis of the received performance level of each application program and the performance level of each logical volume, notified by the storage manager server 13, and causing data migration from the determined source to the determined target to be executed in the storage system 21 and/or the storage system 121.

A single storage system may also be provided. In this embodiment, two storage systems are provided. The storage system 121 will be referred to as an "external storage system" existing outside of the storage system 21. The storage system 21 and external storage system 121 may be connected communicably by a private line that is separate from the first communication network 12A. The storage system 21 and external storage system 121 may employ a substantially identical hardware configuration. Accordingly, an example of this hardware configuration will be described using the storage system 21 as an example (note that in FIG. 1, substantially identical configuration elements of the storage system 21 and external storage system 121 are differentiated by a reference numeral difference of 100).

The storage system 21 may be constituted by a RAID (Redundant Array of Independent (or Inexpensive) Disks) system comprising a plurality of media drives 33, for example. Each media drive 33 comprises storage media (hard disks, DVD disks, or the like, for example) that are capable of storing data. The storage system 21 may comprise a controller 22 in addition to the plurality of media drives 33.

The controller 22 is an apparatus for controlling an operation of the storage system 21. The controller 22 may comprise one or a plurality of first I/Fs 29 serving as I/Fs for communicating with the first communication network 12A, a second I/F 27 which serves as an I/F for communicating with the second communication network 12B, and a drive I/F 31 for controlling communication with each of the media drives 33. The controller 22 may also comprise memory 26 and a CPU 23. Both the memory 26 and the CPU 23 may be provided singly or in a plurality. The memory 26 may comprise a cache region which is capable of temporarily storing data exchanged between the media drives 33 and hosts 1A, 1B, 1C, . . . , a control region which is capable of storing data and computer programs for controlling the storage system 21, and soon, for example. The CPU 23 is capable of reading a computer program from the control region and executing the computer program.

Note that the configuration of the controllers 22, 122 described above is merely one example thereof, and other configurations may be employed. For example, in place of the configuration described above, at least one of the controllers 22 and 122 may comprise a plurality of first control units (control circuit boards, for example) for controlling communication with an external apparatus (a host or the external storage system 121, for example), a plurality of second control units (control circuit boards, for example) for controlling communication with the media drives 33, a cache memory which is capable of storing data exchanged between the external apparatus and the media drives 33, a control memory capable of storing data for controlling the storage system 21, and a connecting unit (a switch such as a crossbar switch, for example) for connecting the first control units, second control units, cache memory, and control memory. In this case, either or both of the first control units and second control units may cooperate to perform processing as a controller to be described below.

An example of the physical configuration of the data migration system according to this embodiment was described above.

Figure 2:
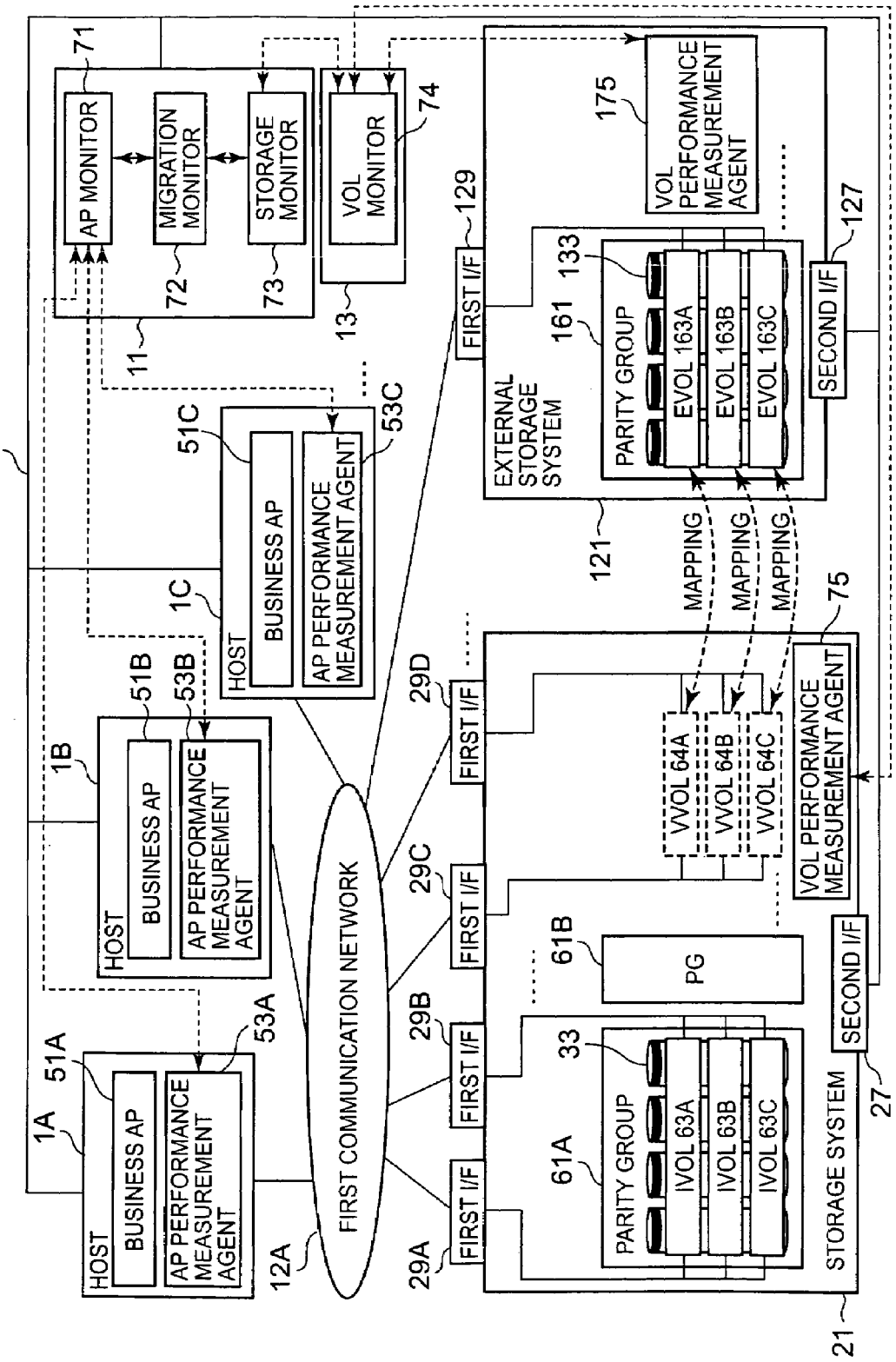
FIG. 2 shows an example of a logical configuration constructed in the data migration system according to this embodiment.

FIG. 2 shows an example of a logical configuration constructed in the data migration system according to this embodiment.

At least one business application program (business AP hereafter) 51A, 51B, 51C and an AP performance measurement agent 53A, 53B, 53C are provided as the computer programs stored in the storage resource 5 of each host 1A, 1B, 1C, . . . , for example. The CPU 3 is capable of performing predetermined processing by reading and executing the various computer programs. Hereafter, to keep description at a minimum length, an expression such as "processing is performed by having the CPU execute the computer program" will be simplified to "a computer program performs processing".

The business AP 51A, 51B, 51C is an application program for conducting a predetermined business (for example, providing a Web service to a client not shown in the drawing). Various other application programs may be installed in the host 1A, 1B, 1C, . . . instead of, or in addition to, the business AP, but in this embodiment, the business AP is assumed to be the only application program. The business AP 51A, 51B, 51C is capable of issuing an IO command to a logical volume of the storage system 21.

The AP performance measurement agent 53A, 53B, 53C is capable of measuring the performance of the business AP installed in its own host and notifying the migration manager server 11 of the measured performance. This measurement may be performed autonomously, either periodically or irregularly, or in response to a request from the migration manager server 11.

Here, IOPS (IO/Second) may be employed as the measured performance, for example. The IOPS is a numerical value indicating the number of IO commands that are issued to or processed in a device (more specifically, a communication port, parity group, or logical volume, for example) per second. The IOPS may be employed to express the performance of a system during the processing of IO commands requesting data in blocks of a first size (a small block size in units of 512 bytes, for example). The IOPS of an AP is the number of IO commands issued by the AP per second. The IOPS of a VOL is the number of times per second the VOL is accessed in response to an IO command.

To facilitate understanding of the following description, it is assumed that the IOPS alone is used as the measured performance, but one or a plurality of other performance indicators may be employed instead of, or in addition to, the IOPS. Examples of other performance indicators include MB/S (Megabyte/Second), for example. The MB/S is a numerical value indicating the amount of data transferred to a device (more specifically, a communication port, parity group, or logical volume, for example) per second. The MB/S may be employed during continuous reading or writing of data in blocks of a second size which is considerably larger than the first size (in other words, during sequential access). The MB/S of an AP is an amount of data traffic output by the AP per second. The MB/S of a VOL is an amount of data traffic relating to the VOL per second (in other words, the amount of data read from the VOL or written to the VOL per second).

A plurality of types of computer program is stored in the memory 26 of the storage system 21. A VOL performance measurement agent 75 is included in the plurality of types of computer program. The VOL performance measurement agent 75 is capable of measuring the IOPS of each logical volume provided in the storage system 21 comprising the VOL performance measurement agent 75, and notifying the storage manager server 13 of the measured IOPS. IOPS measurement may be performed autonomously, either periodically or irregularly, or in response to a request from the storage manager server 13.

A plurality of parity groups 61A, 61B, . . . (or one parity group) is provided in the storage system 21. Each parity group 61A, 61B, . . . is a collection of two or more media drives 33 (media drives having an identical storage capacity, for example) from among the plurality of media drives 33 installed in the storage system 21. The parity group is also known as an array group or a RAID group.

Further, a plurality of logical volumes (occasionally abbreviated to VOL hereafter) is provided in the storage system 21. The logical volume is a logical storage device which can be recognized and accessed by the host 1A, 1B, 1C. The plurality of VOLs includes tangible logical volumes (for convenience, referred to as "internal volumes" or "IVOLs" hereafter) 63A, 63B, 63C, and intangible, virtual logical volumes (virtual volumes or VVOLs hereafter) 64A, 64B, 64C.

The internal volumes 63A, 63B, 63C are constituted by logically dividing the storage resource of a parity group (61A in FIG. 2). In other words, the internal volumes 63A, 63B, 63C require a physical storage resource.

The virtual volumes 64A, 64B, 64C may be provided regardless of the existence of a physical storage resource. Each virtual volume 64A, 64B, 64C can be associated with a corresponding external volume (occasionally referred to as EVOL hereafter) 163A, 163B, 163C. One or a plurality of external volumes may be associated with a single virtual volume, and one or a plurality of virtual volumes may be associated with a single external volume. The external volume is a tangible logical volume existing outside of the storage system 21, or more specifically an internal volume of the external storage system 121 existing within the external storage system 121. As shown in the drawing, for example, when an association is made between the VVOL 64A and the EVOL 163A and the storage system 21 receives an IO command from the host 1A relating to the VVOL 64A, the storage system 21 can issue an IO command relating to the EVOL 163A\* to the external storage system 121. Hence, by accessing the VVOL 64A, the host 1A can access the EVOL 163A\* of the external storage system 121 via the storage system 21. Note that the technique described in Japanese Unexamined Patent Application 2005-107645, for example, may be employed as a technique enabling a host to access an external, tangible logical volume via a virtual logical volume.

A VOL monitor 74, for example, is provided as the computer program stored in the storage resource of the storage manager server 13. The VOL monitor 74 is capable of receiving from the respective VOL performance measurement agents 75, 175 the IOPS of each VOL, measured by the respective VOL performance measurement agents 75, 175. The VOL monitor 74 may issue a request for IOPS measurement to the VOL performance measurement agents 75, 175 autonomously, either periodically or irregularly, or in response to a request from a storage monitor 73. The VOL monitor 74 is capable of notifying the migration manager server 11 of the received IOPS of each VOL.

An AP monitor 71, the storage monitor 73, and a migration monitor 72, for example, are provided as computer programs stored in the storage resource of the migration manager server 11. The AP monitor 71, storage monitor 73, and migration monitor 72 are executed concurrently by the migration manager server 11, for example.

The AP monitor 71 is capable of receiving from the respective AP performance measurement agents 53A, 53B, 53C a measurement value of the IOPS (IOPS measurement value hereafter) of each business AP, measured by the respective AP performance measurement agents 53A, 53B, 53C. The AP monitor 71 may issue a request for IOPS measurement to the AP performance measurement agents 53A, 53B, 53C either periodically or irregularly, and thus obtain the IOPS measurement values. The AP monitor 71 is capable of updating the IOPS measurement values in an AP management table 47 shown in FIG. 6A to the received IOPS measurement values. The AP management table 47 manages information relating to each business AP 51A, 51B, 51C, . . . . The ID, name, and IOPS measurement value of each business AP 51A, 51B, 51C, for example, are recorded in the AP management table 47. The IOPS measurement values recorded in the table 47 may be the latest IOPS measurement values. The table 47 is stored in the storage resource (hard disk or memory, for example) of the migration manager server 11, for example.

The storage monitor 73 is capable of receiving from the VOL monitor 74 the IOPS of each VOL existing in the storage system 21 and external storage system 121. The storage monitor 73 may issue a request for IOPS measurement to the VOL monitor 74 either periodically or irregularly. The storage monitor 73 is capable of updating the IOPS measurement values in a VOL management table 147 shown in FIG. 6B to the received IOPS measurement values. The VOL management table 147 manages information relating to each logical volume. The table 147 is stored in the storage resource of the migration manager server 11, for example. The ID, name, and attributes of each logical volume, the ID of the parity group to which each logical volume belongs, and the IOPS measurement value of each logical volume, for example, are recorded in the VOL management table 147. The IOPS measurement values recorded in the table 147 may be the latest IOPS measurement values. The attributes include at least one of the type, reliability, emulation type, storage capacity, and whether or not the logical volume is unused, for example. If the media drives 33, 133 are hard disk drives, the type may be FC (Fibre Channel), SATA (Serial ATA), or SAS (Serial Attached SCSI), for example.

The migration monitor 72 is capable of determining the logical volume to be set as a source volume and the logical volume to be set as a target volume on the basis of the IOPS of each business AP, received by the AP monitor 71, and the IOPS of each VOL, received by the storage monitor 73. The migration monitor 72 is also capable of causing data migration from the determined source volume to the determined target volume to be executed in the storage system 21 and/or the storage system 121.

An example of the logical configuration in the data migration system was described above. Note that in this embodiment, although not yet described, a volume mapping table 247 such as the example shown in FIG. 6C, illustrating the associations between the VVOLs and EVOLs, is stored in a predetermined physical storage region (for example, the storage resources of the storage system 21 and migration manager server 11). The ID of each VVOL, the ID of the EVOL associated with each VVOL, the attributes of each EVOL, and the ID of the parity group to which each EVOL belongs are recorded in the volume mapping table 247, for example. The parity group ID of each EVOL is reflected in the VOL management table 147 of FIG. 6B as the parity group ID of the VVOL associated with each EVOL, for example. More specifically, for example, when the VVOL 64A is associated with the EVOL 163A and the parity group ID of the EVOL 163A is PG2, as illustrated in the volume mapping table 247, the parity group ID of the VVOL 64A in the VOL management table 147 is identical to the parity group ID of the EVOL 163A, i.e. PG2.

Figure 3:
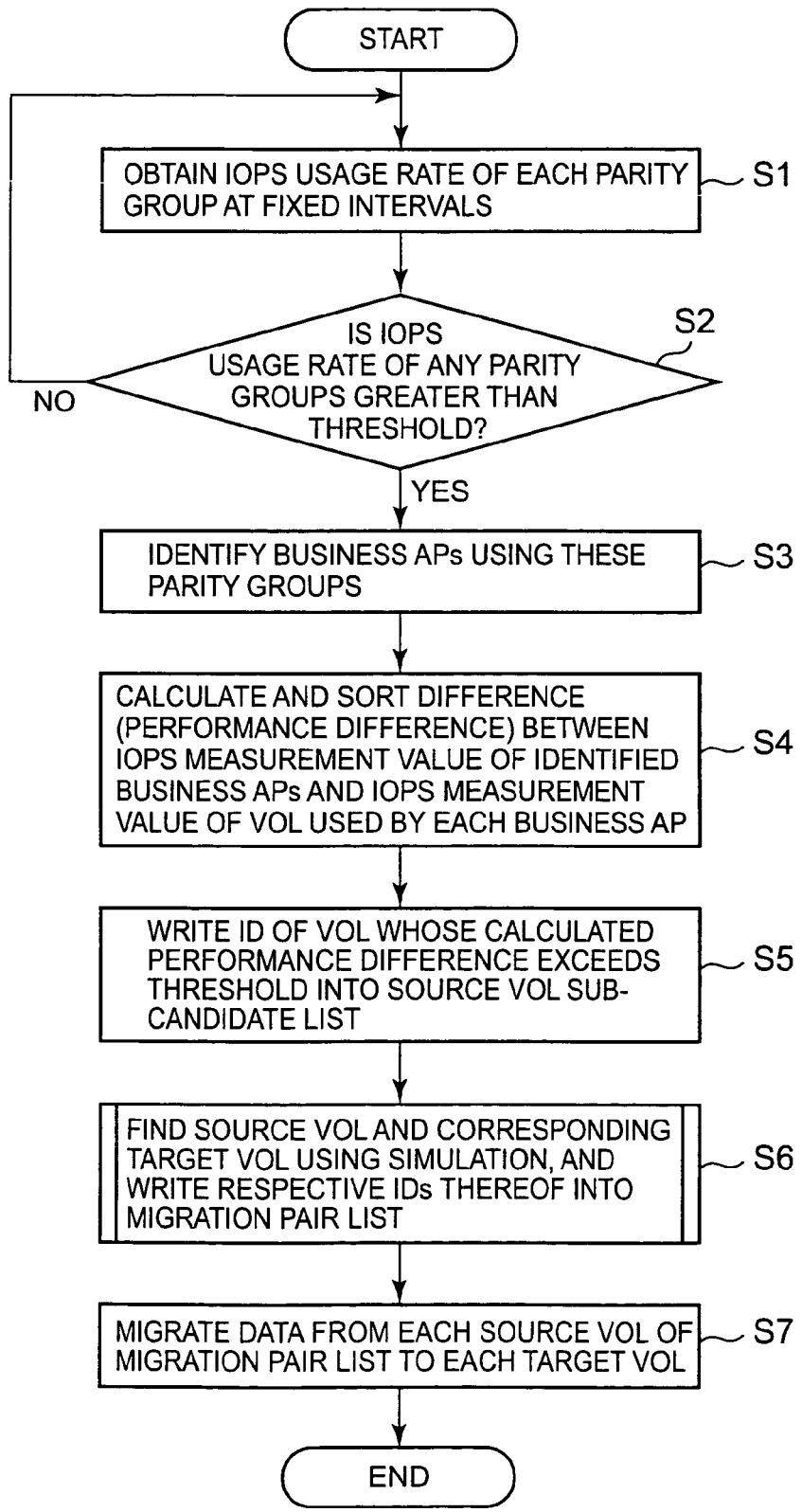
FIG. 3 shows an example of the flow of processing performed by a migration monitor 72.

FIG. 3 illustrates an example of the flow of processing performed by the migration monitor 72.

The migration monitor 72 obtains the IOPS usage rate of each parity group 61A, 61B, 161, . . . at fixed time intervals (step S1). More specifically, for example, the migration monitor 72 is able to calculate the IOPS measurement value of each parity group by adding together the IOPS measurement values of all of the logical volumes belonging to each parity group. The migration monitor 72 obtains a maximum IOPS value of each parity group from a parity management table 248, an example of which is shown in FIG. 7A, and is able to calculate the usage rate of each parity group by dividing the IOPS measurement value of each parity group by the maximum IOPS value. The migration monitor 72 can then update the usage rate of each parity group in the parity management table 248 to the calculated usage rate.

The migration monitor 72 then determines whether or not any of the parity groups have a usage rate that is greater than a predetermined threshold (S2).

If, as a result of S2, the existence of such a parity group is determined (YES in S2), the migration monitor 72 identifies the business APs using the parity group (S3). More specifically, for example, the migration monitor 72 identifies the business AP which accesses each logical volume by referring to an AP/volume association table 249, an example of which is shown in FIG. 7B, and then determines the parity group to which the identified logical volume belongs by referring to the VOL management table 147 (FIG. 6B). In so doing, the migration monitor 72 is able to identify the business APs using each parity group. In short, the business APs which access the logical volumes belonging to the parity group are the business APs which use the parity group.

The migration monitor 72 obtains the IOPS measurement value of each identified business AP from the AP management table 47 (see FIG. 6A), obtains the IOPS measurement value of the logical volume used by each business AP from the VOL management table 147, calculates the difference between the obtained IOPS measurement values (the performance difference hereafter), and sorts the calculated performance differences (S4). Note that here, the term "performance difference" is used simply for convenience, and need not be a value obtained by subtracting one IOPS measurement value from another. More specifically, the "performance difference" may be calculated using the following equations:

the performance difference between a certain VOL and a certain business AP using the certain VOL=the IOPS measurement value of the certain VOL×an efficacy ratio−the IOPS measurement value of the certain business AP (1);

the efficacy ratio=the IOPS measurement value of the parity group to which the certain VOL belongs/ the sum total of the IOPS measurement values of all of the business APs using the parity group (2).

The migration monitor 72 can record the calculated performance differences in a performance difference management table 251, an example of which is shown in FIG. 7C, and then sort the performance differences into descending or ascending order, for example.

This will now be described in further detail using the example illustrated in FIG. 8A.

It is assumed that the business AP 51A accesses the IVOL 63A, the business AP 51B accesses the VOL. 63B, and the business AP 51C accesses the VOL 63C.

The IOPS measurement values of the business AP 51A, the business AP 51B, and the business AP 51C are assumed to be 50000, 40000, and 30000, respectively.

The IOPS measurement values of the IVOLs 63A to 63C belonging to the parity group 61A are each assumed to be 30000. Accordingly, the IOPS measurement value of the parity group 61A is the sum total thereof, i.e. 90000.

In this case, the efficacy ratio is calculated using Equation (2) to be 90000/120000 (the sum total of the IOPS measurement values of each business AP), or in other words 3/4.

Hence, the IOPS measurement value x efficacy ratio is 22500 for each of the IVOLs 63A to 63C. These values indicate the apparent processing efficiency from the business AP side. Assuming that the IOPS measurement value of the IVOL 63A as seen from the business AP 51 side is 30000, for example, a processing rate of only 3/4 is obtained in accordance with the efficacy ratio, and hence, using 30000 as a reference, the IOPS of the IVOL 63A as seen from the business AP 51A side decreases to 22500. Note that an efficacy ratio such as that described above may be used to widen the performance difference between the AP and VOL. In so doing, it is possible to decrease the likelihood of a situation arising in which the performance difference between a certain target VOL and an AP exceeds a threshold following data migration from a certain source VOL to the certain target VOL such that data migration must be performed to another target VOL using the initial target VOL as a source VOL.

As shown in FIG. 7C, the performance difference between the business AP 51A and the IVOL 63A, the performance difference between the business AP 51B and the IVOL 63B, and the performance difference between the business AP 51C and the IVOL 63C are calculated to −27500, −17500, and −7500 respectively, using Equation (1). In other words, for example, the IOPS as seen from the business AP 51A side is 22500, and therefore an apparent processing rate of 27500 is obtained in relation to the IOPS measurement value of 30000. Examples of the possible causes of this performance difference include the fact that data are cached in the memory 26 existing on the data path between the AP and VOL, and electrical delays.

Returning to FIG. 3, the migration monitor 72 writes the ID of a VOL (source VOL sub-candidate hereafter (the IVOL 63A, for example)) having a calculated performance difference (the absolute value thereof, for example) which exceeds the predetermined threshold (−20000, for example) into a source VOL sub-candidate list 253, an example of which is shown in FIG. 8B (S5).

The migration monitor 72 then uses a simulation to be described below to determine a source VOL and a target VOL, and writes the IDs of the determined VOLs into a migration pair list to be described below (S6).

The migration monitor 72 then migrates data from the source VOL of the pair written in the migration pair list to the target VOL of the same pair (S7). Note that when the target VOL is a VVOL (virtual volumes), the data are migrated to the EVOL (external volume) that is associated with the VVOL.

Figure 4:
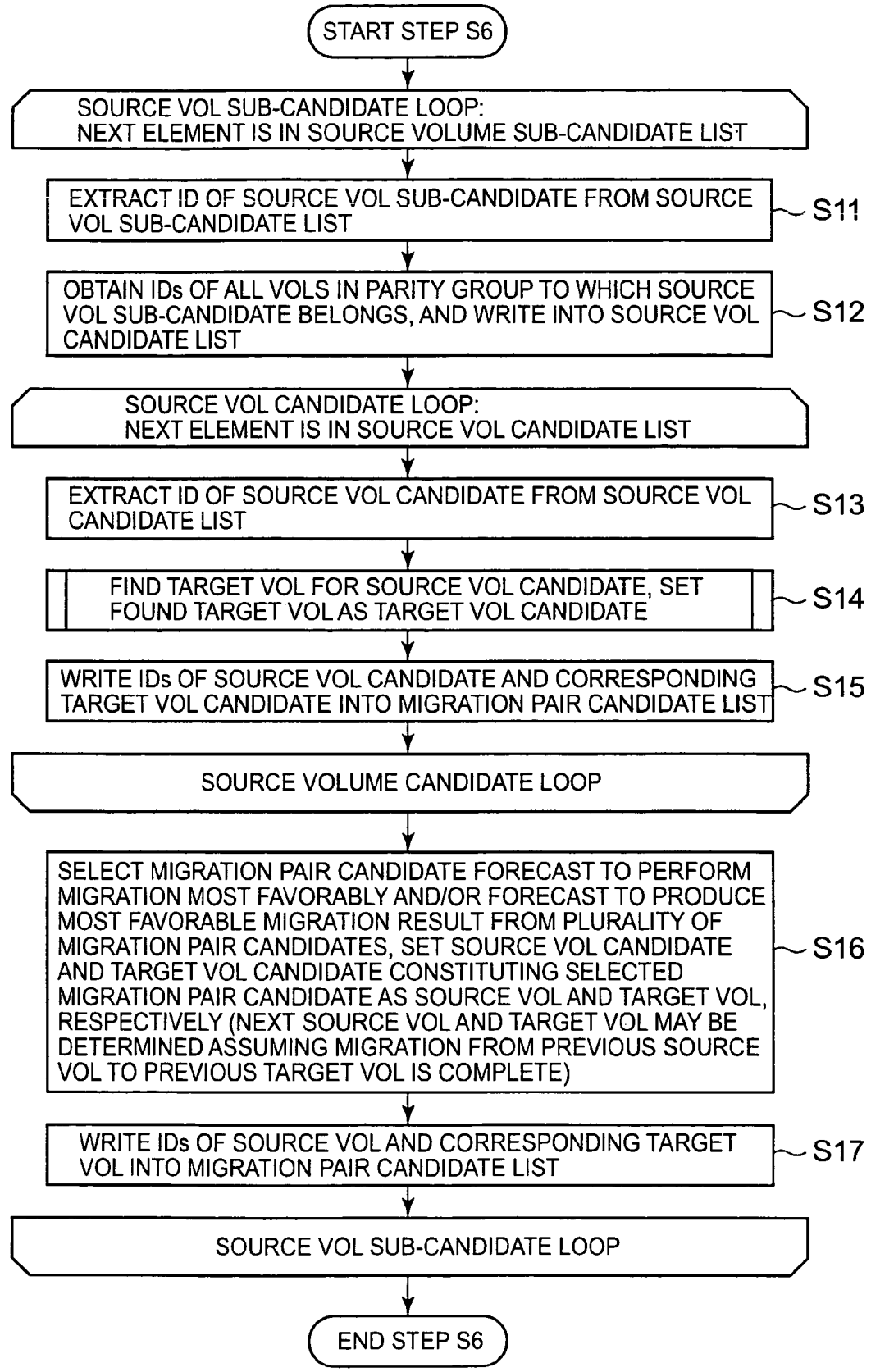
FIG. 4 shows a specific example of the flow of processing performed in a step S6 of FIG. 3.

FIG. 4 shows a specific example of the flow of processing performed in the step S6 of FIG. 3 (i.e. a specific example of the aforementioned simulation).

The migration monitor 72 extracts the ID of the source VOL sub-candidate from the source VOL sub-candidate list 253 (S11). The migration monitor 72 then refers to the VOL management table 147 using the extracted ID to determine the parity group to which the source VOL sub-candidate belongs. The migration monitor 72 obtains the IDs of all of the VOLs belonging to the determined parity group, and writes all of the obtained IDs into a source VOL candidate list 255, an example of which is shown in FIG. 8C (S12). As a result, all of the logical volumes belonging to the parity group to which the source VOL sub-candidate belongs become source VOL candidates.

The migration monitor 72 extracts the ID of a source VOL candidate from the source VOL candidate list 255 (S13). The migration monitor 72 then finds a target VOL candidate for the source VOL candidate (S14), for example, which has a greater IOPS measurement value than that of the source VOL candidate. The migration monitor 72 writes the respective IDs of the source VOL candidate and target VOL candidate into a migration pair candidate list 257, an example of which is shown in FIG. 9A (S15).

The processing of S13 to S15 is repeated until all of the source VOL candidate IDs have been extracted from the source VOL candidate list 255.

The migration monitor 72 then selects from the plurality of migration pair candidates a migration pair candidate forecast to perform the most favorable migration and/or a migration pair candidate forecast to produce the most favorable migration result. The source VOL candidate and target VOL candidate constituting the selected migration pair candidate are then set respectively as the source VOL and target VOL (S16).

The most favorable migration is that which executes migration in the least amount of time, for example. To forecast the migration pair candidate able to perform this migration, the storage capacity (or the amount of stored data) of the source VOL candidate and/or the IOPS (I/O per second) measurement value of the parity group to which the target VOL candidate belongs may be taken into consideration. The reason for taking the IOPS measurement value of the parity group to which the target VOL candidate belongs into consideration is that the performance of the parity group to which the target VOL candidate belongs may be high even when the IOPS measurement value of the target VOL candidate is zero, and if so, this indicates that IO processing is underway in all of the media drives constituting the parity group. Accordingly, a long time period would be required to complete migration.

The most favorable migration result is one in which the performance of the source VOL sub-candidate becomes closer to the performance of the business AP using the source VOL sub-candidate after migration, for example. In other words, with this result, the difference between the performance of the source VOL sub-candidate (e.g., 30000 IOPS of VOL 63A) and the performance of the business AP (e.g., 50000 IOPS of AP 51A) using the source VOL sub-candidate becomes minimum after the migration.

When searching for a source VOL and a target VOL in relation to the next source VOL sub-candidate (e.g., 63A), the migration monitor 72 assumes that data migration pending between the source VOL 63B and the target VOL 64C determined in relation to the previous source VOL sub-candidate as complete by setting the IOPS measurement value of the source VOL 63B as zero (i.e., when the pending migration is actually finished, the source VOL 63B will not be accessed thus its IOPS will become zero), even when this pending data migration is not yet complete. More specifically, for example, the migration monitor 72 is capable of searching for a source VOL and a target VOL in relation to the next source VOL sub-candidate 63A on the basis of the effect obtained as if completing the migration performed in relation to the previous source VOL sub-candidate. Alternatively, the migration monitor 72 assumes that the IOPS measurement value of the target VOL and the IOPS measurement value of the source VOL of the next source VOL sub-candidate 63A are identical, and assumes that the IOPS measurement value of the source VOL of the previous source VOL sub-candidate is zero.

The migration monitor 72 writes the respective IDs of the source VOL and target VOL in a migration pair list 259, an example of which is shown in FIG. 9B (S17).

Figure 5:
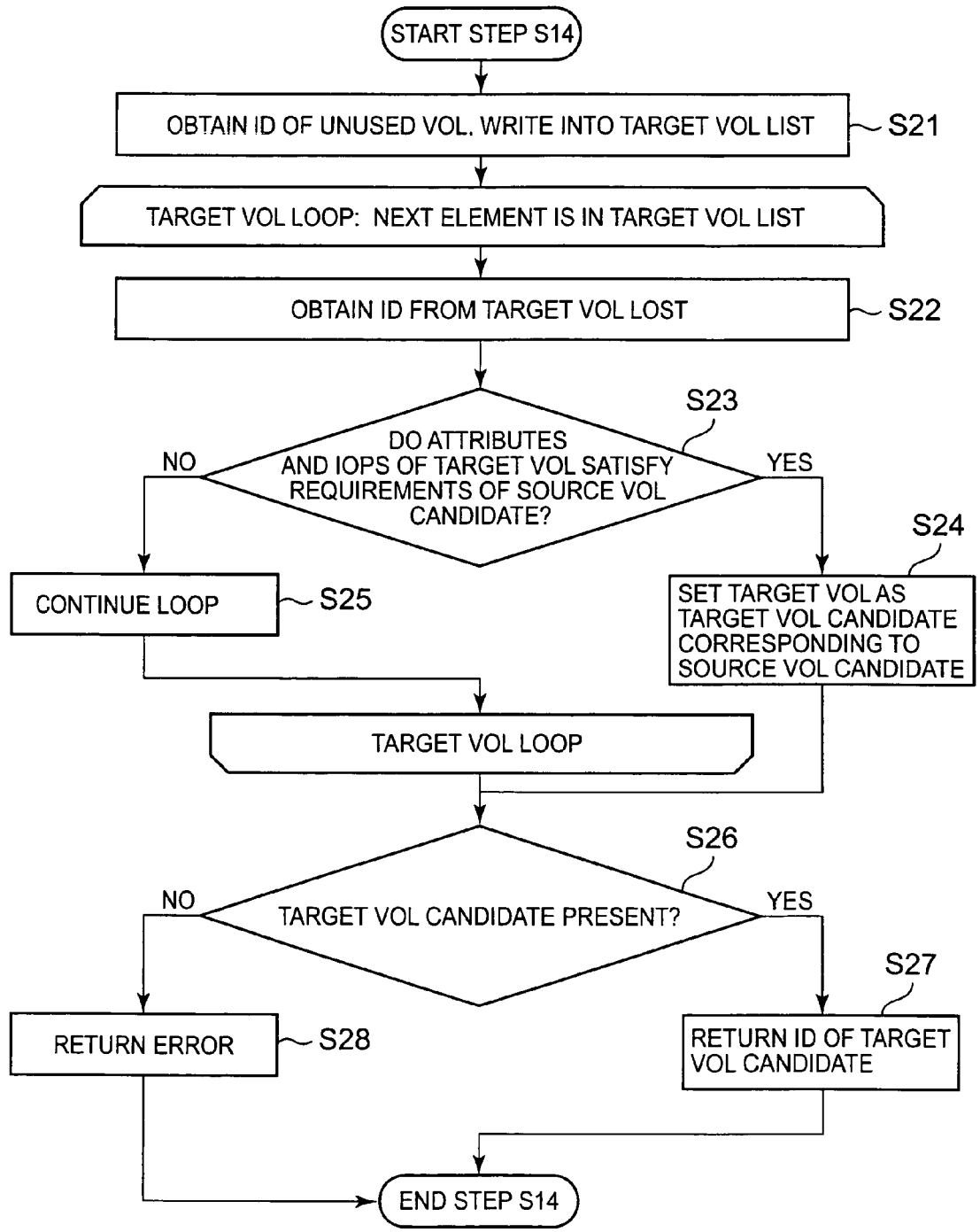
FIG. 5 shows a specific example of the flow of processing performed in a step S14 of FIG. 4.

FIG. 5 shows a specific example of the flow of processing performed in the step S14 of FIG. 4.

The migration monitor 72 extracts the ID of an unused VOL from the VOL management table 147, and writes the extracted ID into a target VOL sub-candidate list 261, an example of which is shown in FIG. 9C (S21).

The migration monitor 72 extracts the ID from the target VOL sub-candidate list 261, and determines whether or not the attributes and IOPS measurement value of the target VOL sub-candidate having the extracted ID satisfy the requirements of the source VOL candidate extracted in the step S13 of FIG. 4 (S23). A target VOL sub-candidate which satisfies the requirements of the source VOL candidate may be a VOL in which the IOPS measurement value of the parity group to which the target VOL sub-candidate belongs is greater than the IOPS measurement value of the source VOL candidate, for example.

If the target VOL sub-candidate does not satisfy the requirements of the source VOL candidate in the step S23 (NO in S23), the migration monitor 72 repeats the step S22 (S25). On the other hand, if the target VOL sub-candidate satisfies the requirements of the source VOL candidate (YES in S23), the migration monitor 72 sets the target VOL sub-candidate as the target VOL candidate of the source VOL candidate, and returns the ID of the target VOL candidate (YES in S26, S27).

If YES is not obtained in S23 for any of the VOL IDs written in the target VOL sub-candidate list 261, the migration monitor 72 is able to return an error (S28).

An embodiment of the present invention was described above. Note that the tables and lists shown in FIGS. 7A to 7C and 8B to 9B may be stored in the storage resource of the migration manager server 11. Further, the source VOL sub-candidate to which the IDs relate may be written into each list.

According to the embodiment described above, when the calculated performance difference between a business AP and a VOL exceeds a predetermined threshold, the VOL is not immediately set as the source VOL, and instead, the plurality of VOLs in the parity group to which the VOL belongs are set as source VOL candidates, whereupon the source VOL is selected from among the source VOL candidates. Moreover, rather than employing any unused VOL as the target VOL, the target VOL is selected on the basis of the IOPS measurement value of an unused VOL and the IOPS measurement value of the parity group to which the unused VOL belongs. In so doing, the performance level required by the business AP can be satisfied as closely as possible. Furthermore, limited storage resources are used effectively, and hence a reduction in TCO (Total Cost of Ownership) is achieved. Also, a suitable target VOL can be selected automatically.

A preferred embodiment of the present invention was described above, but this embodiment is merely an example used to illustrate the present invention, and the scope of the present invention is not limited to this embodiment alone. The present invention may be implemented in various other embodiments.

For example, the VOL performance monitor 74 may be eliminated, and the storage monitor 73 may receive the IOPS measurement value of each logical volume from the respective VOL performance measurement agents 75, 175.

Further, for example, the data migration technique according to the present invention is not limited to a system in which an external storage system is connected to a storage system, and may also be applied to a single storage system. However, the data migration technique of the present invention is considered to be more useful when applied to a system such as that of the embodiment described above, since variation in the performance difference is believed to be greater in a system comprising an external storage system and a storage system than in a single storage system.

What is claimed is:

1. A data migration method for migrating data from a source logical volume to a target logical volume in one or more storage systems including a plurality of parity groups, each of said parity groups including logical volumes configured by physical storage devices, the method comprising:
  obtaining an access source performance, which is a performance of an access source of a logical volume, for each of a plurality of access sources;
  obtaining a volume performance, which is a performance of a logical volume, for each logical volume;
  selecting a source volume sub-candidate from said plurality of logical volumes on the basis of said obtained access source performance of each access source and said obtained volume performance of each logical volume;
  identifying a parity group to which said selected source volume sub-candidate belongs from said plurality of parity groups;
  identifying access sources of the identified parity group from said plurality of access sources;
  calculating a degree of performance degradation for each of a plurality of access pairs, which are pairs constituted by each access source and the logical volume serving as the access destination thereof, on the basis of (1) a total access source performance which is a sum total of access source performances corresponding respectively to said identified access sources, and (2) a parity performance which is a sum total of volume performances corresponding respectively to the logical volumes belonging to said certain parity group;
  setting a logical volume of an access pair, whose calculated degree of performance degradation exceeds a predetermined value, as said source volume sub-candidate;
  selecting one of source volume sub-candidates belonging to said identified parity group, and selecting a target volume from said plurality of logical volumes which has a volume performance greater than a volume performance of said one source volume sub-candidate; and
  migrating data from said one source volume sub-candidate to said selected target volume,
  wherein said degree of performance degradation for a single access pair=the volume performance of the logical volume constituting said access pair×an efficacy ratio—the access source performance of the access source constituting said access pair, and
  said efficacy ratio=said parity performance/said total access source performance.

2. The data migration method according to claim 1, further comprising:
on the basis of the volume performance of each source volume candidate and the volume performance of each logical volume other than said source volume candidates, selecting a target volume candidate for each of said source volume candidates from other logical volumes to make a pair with said source volume candidate, and
selecting a pair forecast to perform migration most favorably and/or forecast to produce a most favorable migration result from a plurality of said pairs,
wherein said selected source volume and said selected target volume are the source volume candidate and the target volume candidate constituting said selected pair.

3. The data migration method according to claim 2, wherein said pair forecast to perform migration most favorably is a pair which executes migration in the least amount of time.

4. The data migration method according to claim 2, wherein said pair forecast to produce said most favorable migration result is a pair which, after performing migration, becomes closer to a performance of a application program using the source VOL sub-candidate.

5. The data migration method according to claim 1, wherein said parity performance of each parity group/a maximum performance of each parity group = a usage rate of each parity group, and
a parity group whose calculated usage rate exceeds a predetermined threshold is said certain parity group.

6. The data migration method according to claim 1, wherein, when a plurality of said source volume sub-candidates exists, selection of a source volume and a target volume is performed in relation to one of said plurality of source volume sub-candidates assuming that data migration to a target volume from a source volume selected in relation to another source volume sub-candidate is complete, even when said data migration is not complete.

7. The data migration method according to claim 1, wherein each of said access sources issues an IO command to an access destination logical volume to read data from said logical volume or write data to said logical volume,
said access source performance of a certain access source is a number of IO commands issued from said certain access source per unit time, and
said volume performance of a certain logical volume is a number of IO commands relating to said certain logical volume that are received in said storage system per unit time.

8. The data migration method according to claim 1, wherein said access source performance of a certain access source is an amount of data traffic output from said certain access source per unit time, and
said volume performance of a certain logical volume is an amount of data traffic received in said storage system in relation to said certain logical volume per unit time.

9. The data migration method according to claim 1, wherein said one or more storage systems comprise a storage system and an external storage system, which is a storage system existing on the exterior of said storage system,
said storage system comprises a virtual volume, which is a virtual logical volume,
said virtual volume is associated with an external volume, which is a logical volume provided on a parity group provided in said external storage system, and
when said selected target volume is said virtual volume, data are migrated to said external volume associated with said virtual volume.

10. The data migration method according to claim 1, wherein one of said access sources is an application program executed on a host or an operating system of said host.

11. A data migration system for migrating data from a source logical volume to a target logical volume, comprising:
one or more storage systems each including a plurality of parity groups, each of said parity groups being constituted by logical volumes that are configured by physical storage devices;
an access source performance obtaining unit that obtains an access source performance, which is a performance of an access source of a logical volume, for each of a plurality of access sources;
a volume performance obtaining unit that obtains a volume performance, which is a performance of a logical volume, for each of said plurality of logical volumes provided in said one or more storage systems;
a sub-candidate selection unit that selects a source volume sub-candidate from said plurality of logical volumes on the basis of said obtained access source performance of each access source and said obtained volume performance of each logical volume;
a parity identification unit that identifies a parity group to which said selected source volume sub-candidate belongs from said plurality of parity groups;
an access sources identification unit that identifies access sources of the identified parity group from said plurality of access sources;
a calculating unit that calculates a degree of performance degradation for each of a plurality of access pairs, which are pairs constituted by each access source and the logical volume serving as the access destination thereof, on the basis of (1) a total access source performance which is a sum total of access source performances corresponding respectively to said identified access sources, and (2) a parity performance which is a sum total of volume performances corresponding respectively to the logical volumes belonging to said certain parity group;
a unit that sets a logical volume of an access pair, whose calculated degree of performance degradation exceeds a predetermined value, as said source volume sub-candidate;
a source/target selection unit that selects one of source volume sub-candidates belonging to said identified parity group, and that selects a target volume from said plurality of logical volumes which has a volume performance greater than a volume performance of said one source volume sub-candidate; and
a migration unit that migrates data from said one source volume sub-candidate to said selected target volume,
wherein said degree of performance degradation for a single access pair=the volume performance of the logical volume constituting said access pair×an efficacy ratio—the access source performance of the access source constituting said access pair, and
said efficacy ratio=said parity performance/said total access source performance.

12. The data migration system according to claim 11, wherein, on the basis of the volume performance of each source volume candidate and the volume performance of each logical volume other than said source volume candidates, said source/target selection unit selects a target volume candidate for each of said source volume candidates from other logical volumes to make a pair with said source volume candidate, and selects a pair forecast to perform migration most favorably and/or forecast to produce a most favorable migration result from a plurality of said pairs, and said selected source volume and said selected target volume are the source volume candidate and the target volume candidate constituting said selected pair.

13. A computer program embedded in a computer readable storage medium and executable by a computer to migrate data from a source logical volume to a target logical volume in one or more storage systems including a plurality of parity groups, each of said parity groups including logical volumes configured by physical storage devices, said computer program comprising:

a module that obtains an access source performance, which is a performance of an access source of a logical volume, for each of a plurality of access sources;

a module that obtains a volume performance, which is a performance of a logical volume, for each logical volume, a module that selects a source volume sub-candidate from said plurality of logical volumes on the basis of said obtained access source performance of each access source and said obtained volume performance of each logical volume, a module that identifies a parity group to which said selected source volume sub-candidate belongs from said plurality of parity groups, a module that identifies access sources of the identified parity group from said plurality of access sources, a module that calculates a degree of performance degradation for each of a plurality of access pairs, which are pairs constituted by each access source and the logical volume serving as the access destination thereof, on the basis of (1) a total access source performance which is a sum total of access source performances corresponding respectively to said identified access sources, and (2) a parity performance which is a sum total of volume performances corresponding respectively to the logical volumes belonging to said certain parity group, a module that sets a logical volume of an access pair, whose calculated degree of performance degradation exceeds a predetermined value, as said source volume sub-candidate, a module that selects one of source volume sub-candidates belonging to said identified parity group, and that selects a target volume from said plurality of logical volumes which has a volume performance greater than a volume performance of said one source volume sub-candidate, and a module that migrates data from said one source volume sub-candidate to said selected target volume, wherein said degree of performance degradation for a single access pair=the volume performance of the logical volume constituting said access pair×an efficacy ratio—the access source performance of the access source constituting said access pair, and said efficacy ratio=said parity performance/said total access source performance.

14. A data migration method for migrating data from a source logical volume to a target logical volume in a system including one or more hosts having one or more application programs which operate on an operating system of each host, and one or more storage systems including a plurality of parity groups, each of said parity groups including logical volumes configured by physical storage devices, comprising:

obtaining an AP performance, which is a performance of an application program ("AP"), for each of said application programs;

obtaining a volume performance, which is a performance of a logical volume, for each of said logical volumes;

identifying, for each parity group, application programs which access logical volumes belonging to said each parity group from said plurality of application programs;

calculating a usage rate of said each parity group by dividing a parity performance of said each parity group with a maximum performance of said each parity group, said parity performance being a sum total of volume performances corresponding respectively to the logical volumes belonging to said each parity group;

setting a parity group whose calculated usage rate exceeds a predetermined threshold as an identified parity group;

calculating a degree of performance degradation for each of a plurality of access pairs, which are pairs constituted by each application program identified as accessing the logical volumes of the identified parity group and one of the logical volumes of the identified parity group serving as the access destination thereof, on the basis of said obtained AP performance of each application program and said obtained volume performance of each logical volume;

setting the logical volume of an access pair whose calculated degree of performance degradation exceeds a predetermined value as a source volume sub-candidate;

on the basis of the volume performance of each source volume candidate belonging to said identified parity group, and the volume performance of each logical volume other than said source volume candidates, selecting a target volume candidate for each of said source volume candidates from other logical volumes to make a pair with said source volume candidate, and a pair forecast to perform migration most favorably and/or forecast to produce a most favorable migration result is selected from a plurality of said pairs;

setting the source volume candidate and the target volume candidate constituting said selected pair as said source volume and said target volume; and migrating data from said selected source volume to said selected target volume.

15. A data migration system for migrating data from a source logical volume to a target logical volume, comprising:

one or more hosts having one or more application programs which operate on an operating system of each host;

one or more storage systems including a plurality of parity groups, each of said parity groups including logical volumes configured by physical storage devices;

an AP performance obtaining unit that obtains an AP performance, which is a performance of an application program ("AP"), for each of said application programs;

a volume performance obtaining unit that obtains a volume performance, which is a performance of a logical volume, for each of said logical volumes;

a unit that identifies, for each parity group, application programs which access logical volumes belonging to said each parity group from said plurality of application programs;

a unit that calculates a usage rate of said each parity group by dividing a parity performance of said each parity group with a maximum performance of said each parity group, said parity performance being a sum total of volume performances corresponding respectively to the logical volumes belonging to said each parity group;

a unit that sets a parity group whose calculated usage rate exceeds a predetermined threshold as an identified parity group;

a sub-candidate selection unit that calculates a degree of performance degradation for each of a plurality of access pairs, which are pairs constituted by each application program identified as accessing the logical volumes of the identified parity group and one of the logical volumes of the identified parity group serving as the access destination thereof, on the basis of said obtained AP performance of each application program and said obtained volume performance of each logical volume, and setting the logical volume of an access pair whose calculated degree of performance degradation exceeds a predetermined value as a source volume sub-candidate;

a pair selection unit that selects, on the basis of the volume performance of each source volume candidate belonging to said identified parity group, and the volume performance of each logical volume other than said source volume candidates, a target volume candidate for each of said source volume candidates from other logical volumes to make a pair with said source volume candidate, and that selects a pair forecast to perform migration most favorably and/or forecast to produce a most favorable migration result from a plurality of said pairs; and a migration unit that sets the source volume candidate and target volume candidate constituting said selected pair as said source volume and said target volume, and that migrates data from said selected source volume to said selected target volume.

16. A computer program embedded in a computer readable storage medium and executable by a computer to migrate data from a source logical volume to a target logical volume in a system including one or more hosts having one or more application programs which operate on an operating system of each host, and one or more storage systems including a plurality of parity groups, each of said parity groups including logical volumes configured by two or more physical storage devices, said computer program comprising:

a module that obtains an AP performance, which is a performance of an application program ("AP"), for each of said application programs;

a module that obtains a volume performance, which is a performance of a logical volume, for each of said logical volumes;

a module that identifies, for each parity group, application programs which access logical volumes belonging to said each parity group from said plurality of application programs;

a module that calculates a usage rate of said each parity group by dividing a parity performance of said each parity group with a maximum performance of said each parity group, said parity performance being a sum total of volume performances corresponding respectively to the logical volumes belonging to said each parity group;

a module that sets a parity group whose calculated usage rate exceeds a predetermined threshold as an identified parity group;

a module that calculates a degree of performance degradation for each of a plurality of access pairs, which are pairs constituted by each application program identified as accessing the logical volumes of the identified parity group and one of the logical volumes of the identified parity group serving as the access destination thereof, on the basis of said obtained AP performance of each application program and said obtained volume performance of each logical volume, and that sets the logical volume of an access pair whose calculated degree of performance degradation exceeds a predetermined value as a source volume sub-candidate;

a module that, on the basis of the volume performance of each source volume candidate belonging to said identified parity group, and the volume performance of each logical volume other than said source volume candidates, selects a target volume candidate is selected for each of said source volume candidates from other logical volumes to make a pair with said source volume candidate, and a pair forecast to perform migration most favorably and/or forecast to produce a most favorable migration result from a plurality of said pairs; and a module that sets the source volume candidate and target volume candidate constituting said selected pair as said source volume and said target volume, and that migrates data from said selected source volume to said selected target volume.

* * * * *